United States Patent
Nelson

(10) Patent No.: US 7,674,863 B2
(45) Date of Patent: Mar. 9, 2010

(54) ESTERIFIED COPOLYMERS OF POLYALKENES/UNSATURATED ACIDIC REAGENTS USEFUL AS LUBRICANT AND FUEL ADDITIVES

(75) Inventor: Kenneth D. Nelson, Clearklake, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 154 days.

(21) Appl. No.: 11/879,641

(22) Filed: Jul. 18, 2007

(65) Prior Publication Data

US 2008/0009427 A1    Jan. 10, 2008

Related U.S. Application Data

(62) Division of application No. 10/608,512, filed on Jun. 27, 2003, now Pat. No. 7,256,242.

(51) Int. Cl.
C08F 8/14 (2006.01)
C08C 19/36 (2006.01)
C08F 20/08 (2006.01)

(52) U.S. Cl. .............. 525/384; 525/386; 525/327.4; 525/327.7; 525/329.5; 525/333.7

(58) Field of Classification Search .............. 525/327.4, 525/327.7, 329.5, 384, 386, 333.7
See application file for complete search history.

(56) References Cited

U.S. PATENT DOCUMENTS

| | | | |
|---|---|---|---|
| 2,551,813 A | 5/1951 | Pinkney et al. | |
| 3,155,686 A | 11/1964 | Prill et al. | |
| 3,197,409 A | 7/1965 | Vries | |
| 3,461,108 A | 8/1969 | Heilman et al. | |
| 3,476,774 A | 11/1969 | Zaweski et al. | |
| 3,560,456 A | 2/1971 | Hazen et al. | |
| 3,560,457 A | 2/1971 | Hazen et al. | |
| 3,580,893 A | 5/1971 | Heilman et al. | |
| 3,706,704 A | 12/1972 | Heilman et al. | |
| 3,729,450 A | 4/1973 | Galiano et al. | |
| 3,729,451 A | 4/1973 | Blecke et al. | |
| 3,819,660 A | 6/1974 | Cahill et al. | |
| 4,034,038 A | 7/1977 | Vogel | |
| 4,152,499 A | 5/1979 | Boerzel et al. | |
| 4,589,990 A | 5/1986 | Zehler et al. | |
| 4,605,808 A | 8/1986 | Samson | |
| 4,711,736 A | 12/1987 | Horodysky et al. | |
| 4,931,197 A | 6/1990 | Beck et al. | |
| 4,999,400 A | 3/1991 | Kuhne et al. | |
| 5,112,507 A | 5/1992 | Harrison | |
| 5,175,225 A | 12/1992 | Ruhe, Jr. | |
| 5,616,668 A | 4/1997 | Harrison et al. | |
| 5,792,729 A | 8/1998 | Harrison et al. | |
| 6,156,850 A | 12/2000 | Harrison et al. | |
| 6,451,920 B1 * | 9/2002 | Harrison et al. | ......... 525/327.4 |
| 2003/0130140 A1 | 7/2003 | Harrison et al. | |

FOREIGN PATENT DOCUMENTS

| | | |
|---|---|---|
| DE | 1 645 259 | 5/1970 |
| DE | 2014475 | 10/1970 |
| EP | 0 658 572 | 6/1995 |
| EP | 1 316 564 | 6/2003 |
| GB | 1031140 | 5/1966 |
| GB | 1296293 | 11/1972 |
| GB | 1543359 | 4/1979 |
| GB | 2231873 | 11/1990 |
| WO | WO 02/094889 | 11/2002 |

* cited by examiner

*Primary Examiner*—Roberto Rábago
(74) *Attorney, Agent, or Firm*—Claude J. Caroli; M. Carmen & Associates, PLLC

(57) ABSTRACT

Esterified polyalkene/UAR copolymer reaction products useful as (1) a friction modifier for lubricating oils such as automatic transmission fluids to improve torque capacity and anti-shudder durability and for continuous variable transmissions (CVTs), (2) a friction modifier for fuels or (3) a cold flow improver for diesel fuels are provided. The esterified copolymer reaction product may be used as is or can be further derivatized (e.g., by post treatment of the esterified copolymer reaction product with, for example, ethylene carbonate or boric acid).

18 Claims, 2 Drawing Sheets

ESTERIFIED COPOLYMERS OF POLYALKENES/UNSATURATED ACIDIC REAGENTS USEFUL AS LUBRICANT AND FUEL ADDITIVES

PRIORITY

This application is a divisional of U.S. patent application Ser. No. 10/608,512, filed Jun. 27, 2003, now U.S. Pat. No. 7,256,242, the contents of which are incorporated herein by reference.

BACKGROUND OF THE INVENTION

1. Technical Field

The present invention generally relates to esterified copolymers of polyalkenes and unsaturated acidic reagents ("UAR") and their use as lubricant and fuel additives. More particularly, the present invention is directed to reaction products derived from polyols and copolymers of polyalkenes, e.g., polyisobutenes ("PIB"), and unsaturated acidic reagents, a process for making same and the use of the reaction product as (1) a friction modifier for lubricating oils such as automatic transmission fluids to improve torque capacity, viscosity control and anti-shudder durability and for continuously variable transmissions (CVTs), (2) a friction modifier for fuels and (3) a cold flow improver for diesel fuels. The esterified polyalkene/UAR copolymer reaction products may be used as is or can be further derivatized (e.g., by post treatment of the reaction product with, for example, boric acid).

2. Description of Related Art

Esterified polyisobutenyl succinic anhydrides have been used as additives for lubricating oils, e.g., commercially available succinate pentaerythritol esters such as Lubrizol 936 available from The Lubrizol Corporation (Wickliffe, Ohio). These esters have been generally prepared by reacting polybutylene and maleic anhydride under suitable conditions to form a polybutene/maleic anhydride monomer (PIBSA) and then further reacting the monomer with pentaerythritol to provide an esterified polybutene/maleic anhydride monomer.

In addition, copolymers of polyisobutene and maleic anhydride have also been prepared. These copolymers are sometimes referred to as "polyPIBSA". They can be prepared by copolymerizing a polybutene containing a high concentration of the methylvinylidene isomer (along with other polybutene isomers) with an unsaturated acidic reagent such as maleic anhydride using a free radical initiator. See, e.g., U.S. Pat. Nos. 5,112,507 and 5,616,668.

U.S. Pat. No. 6,451,920 discloses a process for preparing a polyPIBSA/acid-catalyzed thermal PIBSA monomer mixture employing the steps of (a) copolymerizing (1) polybutene containing alkylvinylidene isomer and non-alkylvinylidene isomers and (2) an unsaturated acidic reagent under polymerization conditions in the presence of a free radical initiator; and (b) reacting the product of step (a) with an unsaturated acidic reagent at elevated temperature in the presence of a strong acid. These polyPIBSA/acid-catalyzed thermal PIBSA monomer mixtures contain a high ratio of anhydride units per polybutene unit as evidenced by a succinic ratio greater than one (as shown in the '920 patent examples). This high succinic ratio is related to multiple anhydride units per polybutene within the thermal PIBSA monomer, and to the presence of poly-anhydride resin. The mixture can be further reacted with an amine to form a polysuccinimide or with a polyol to form a polyester. When reacting the polyPIBSA/acid-catalyzed thermal PIBSA monomer mixture with a polyol, crosslinking between the polyPIBSA, acid-catalyzed thermal PIBSA and resin results.

SUMMARY OF THE INVENTION

The present invention provides esterified polyalkene/unsaturated acidic reagent copolymer reaction products. The present invention preferably provides reaction products of polyols with PIB/UAR copolymers (The PIB/UAR copolymer). Accordingly, in one embodiment of the present invention, one or more esterified polyalkene/UAR copolymers is provided, the esterified polyalkene/UAR copolymers comprising a reaction product of a polyol and a copolymer of the general formula (I):

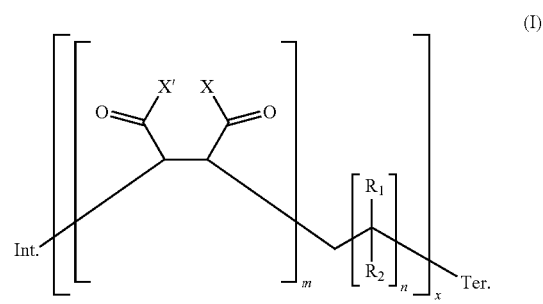

wherein X and X' in each repeating unit of the copolymer are independently selected from the group consisting of —OH; —O—$R_3$ wherein $R_3$ is a lower alkyl of 1 to 6 carbon atoms; or taken together are —O— to form a succinic anhydride group; n is a whole integer from 1 to 3; $R_1$ is a lower alkyl of 1 to 6 carbon atoms; $R_2$ is a polyalkyl group having about 9 to about 200 carbon atoms; m is a whole integer of from 1 to 3; x is a number greater than 1 up to 20; Int. is at least one initiating radical; and Ter. is at least one terminating group; and wherein the copolymer has a succinic ratio of about 1.

The succinic ratio of the copolymer refers to the ratio of the number of groups derived from the unsaturated acidic reagent (m) to the number of groups derived from the polyalkene (n), that is m/n.

A preferred embodiment of the present invention is one or more esterified PIB/UAR copolymers wherein the esterified copolymer is a reaction product of a polyol and a copolymer of the formula (II):

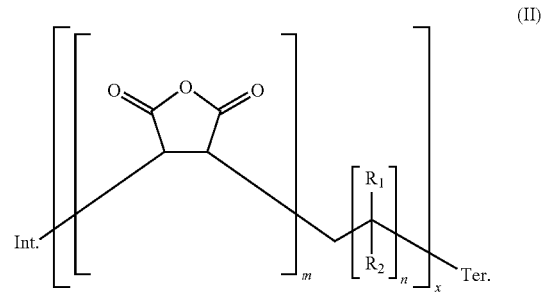

wherein n is a whole integer from 1 to 3; $R_1$ is a lower alkyl of 1 to 6 carbon atoms; $R_2$ is a polyisobutyl group having about 9 to about 200 carbon atoms; m is a whole integer of from 1 to 3; x is a number greater than 1 up to 20; Int. is at least one initiating radical; and Ter. is at least one terminating group;

and wherein the copolymer has a succinic ratio of about 1. The esterified PIB/UAR copolymers may have an average degree of polymerization of about 1.1 to about 20. The esterified PIB/UAR copolymers may have a number average molecular weight of about 600 to about 30,000.

A more preferred embodiment of the present invention is one or more esterified PIB/UAR copolymers obtained from the reaction of polyisobutene with maleic anhydride, in the presence of a free radical initiator, followed by partial esterification with a polyol. A most preferred embodiment of the present invention is one or more esterified copolymers obtained from the reaction of polyisobutene having a number average molecular weight ($M_n$) ranging from about 350 to about 700 with maleic anhydride, in the presence of a free radical initiator, followed by partial esterification with a polyol.

Another embodiment of the present invention is a process for preparing esterified polyalkene/UAR copolymers comprising the step of reacting a polyol with a copolymer consisting essentially of a reaction product obtained from the copolymerization of one or more polyalkenes having from about 9 to about 200 carbon atoms with one or more unsaturated acidic reagents in the presence of one or more free radical initiators.

Yet another embodiment of the present invention is a process for making one or more esterified polyalkene/UAR copolymers comprising the steps of (a) reacting a first amount of a polyalkene having from about 9 to about 200 carbon atoms with a first amount of an unsaturated acidic reagent in the presence of a first amount of a free radical initiator to form a first liquid polyalkene/UAR copolymer, (b) reacting a second amount of polyalkene having from about 9 to about 200 carbon atoms and a second amount of an unsaturated acidic reagent in the presence of a second amount of a free radical initiator and in the presence of the first liquid polyalkene/UAR copolymer of step (a) to form a mixture of a first and a second liquid polyalkene/UAR copolymer and (c) esterifying the mixture of first and second liquid polyalkene/UAR copolymers with a polyol to provide an esterified liquid polyalkene/UAR copolymer product.

A further embodiment of the present invention is a lubricating oil composition which comprises a major amount of an oil of lubricating viscosity and a minor effective amount of the foregoing esterified polyalkene/UAR copolymer reaction products. Also provided by the present invention is a lubricating oil concentrate comprising about 10 wt. % to about 90 wt. % of the foregoing esterified polyalkene/UAR copolymer reaction products and about 90 wt. % to about 10 wt. % of an organic diluent.

Still yet a further embodiment of the present invention is a fuel concentrate comprising a major amount of an inert stable oleophilic organic solvent boiling in the range of about 150° F. to about 400° F. and a minor effective amount of the foregoing esterified polyalkene/UAR copolymer reaction products.

Another embodiment of this invention is a power transmission fluid composition comprising a major amount of an oil of lubricating viscosity and a minor effective amount of the foregoing esterified polyalkene/UAR copolymer reaction products. Yet another embodiment is a process for improving the torque capacity, low temperature operability and anti-shudder durability of a power transmission composition which comprises incorporating a minor effective amount of the foregoing esterified polyalkene/UAR copolymer reaction products into a power transmission composition.

Another embodiment of the present invention is a fuel composition comprising (a) a major amount of a hydrocarbon fuel and (b) a minor fuel economy improving effective amount of the foregoing esterified polyalkene/UAR copolymer reaction products. Yet another embodiment is a process for improving the fuel economy of a diesel engine fuel which comprises operating the diesel engine with a fuel composition comprising (a) a major amount of a diesel fuel and (b) a minor fuel economy improving effective amount of the foregoing esterified polyalkene/UAR copolymer reaction products.

The foregoing esterified polyalkene/UAR copolymer reaction products may also be post treated with one or more cyclic carbonates or one or more linear mono- or poly-carbonates under reactive conditions to form one or more post-treated dispersants. A preferred cyclic carbonate is ethylene carbonate. This post-treated dispersant may be part of a lubricating oil composition comprising a major amount of an oil of lubricating viscosity and a minor effective amount of the post-treated dispersant. Also provided is a lubricating oil concentrate comprising about 90 wt. % to about 10 wt. % of an oil of lubricating viscosity and about 10 wt. % to about 90 wt. % of the post-treated dispersant. The foregoing esterified polyalkene/UAR copolymer reaction products may also be post-treated with one or more of boron oxide, boron halide, boric acid, and esters of boric acid under reactive conditions to form one or more post-treated dispersants which can be employed in a lubricating oil composition or lubricating oil concentrate.

Also provided by the present invention is a fuel concentrate comprising an inert stable oleophilic organic solvent boiling in the range of about 150° F. to about 400° F. and about 5 to about 70 wt. % of the foregoing esterified polyalkene/UAR copolymer reaction products.

The foregoing esterified polyalkene/UAR copolymer reaction products and particularly the esterified PIB/UAR copolymer reaction products of the present invention advantageously provide high torque capacity without causing shudder when employed in a transmission composition. These reaction products are also useful when employed in lubricants and fuels.

Definitions

As used in the present disclosure, whether or not capitalized, the following terms have the following meanings unless specifically stated otherwise.

The term "PIB" is an abbreviation for polyisobutene.

The term "UAR" is an abbreviation for unsaturated acidic reagent(s).

The expression "PIB/UAR copolymer" as used herein shall be understood to mean a copolymer prepared using PIB and unsaturated acidic reagent.

The expression "molecular weight" as used herein shall be understood to mean number average molecular weight ($M_n$).

The expression "degree of polymerization" expresses the length of a polymer or 1:1 copolymer and refers to the number of repeating (monomeric) units in the chain. The number average molecular weight of a polymer or 1:1 copolymer is the product of the degree of polymerization and the number average molecular weight of the repeating unit monomer(s). Accordingly, the average degree of polymerization is calculated by dividing the number average molecular weight of the polymer by the number average molecular weight of the repeating unit monomer(s).

The term "alkylvinylidene" or the expression "alkylvinylidene isomer" refers to olefins and polyalkylene components having the following vinylidene structure (A)

wherein R is a polyalkyl group having about 9 to about 200 carbon atoms and R' is an alkyl of about 1 to about 6 carbon atoms.

The expression "chain transfer agent" as used herein shall be understood to mean an agent that will provide an active hydrogen or halogen that can be abstracted during a polymerization reaction. Chain transfer reactions stop a growing chain radical and start a new one in its place. Thus chain transfer results in shorter chains, lower degree of polymerization and lower molecular weights. Typical chain transfer agents may include mercaptans, aromatic compounds with benzylic hydrogens, and halogenated hydrocarbons such as carbon tetrachloride and carbon tetrabromide.

The term "SAP" refers to Saponification Number and may be determined by the procedure described in ASTM D94 or any other equivalent procedure.

The term "TAN" refers to Total Acid Number and may be determined by the procedure described in ASTM D 664 or any other equivalent procedure.

The expression "succinic ratio" may be calculated from the saponification number (mg KOH per gram of sample), the actives content of the alkenyl or alkyl succinic anhydride product and the molecular weight of the starting polyolefin. The actives content of the alkenyl or alkyl succinic anhydride product is measured in terms of the actives fraction, wherein an actives fraction of 1.0 is equivalent to 100 weight percent actives. Accordingly, an actives fraction of 0.5 would correspond to 50 weight percent actives.

The succinic ratio of the alkenyl or alkyl succinic anhydride product of maleic anhydride and polyolefin can be calculated in accordance with the following equation:

$$\text{Succinic ratio} = \frac{M_{po} \times P}{(C \times A) - (M_{ma} \times P)}$$

wherein
P=saponification number of the alkenyl or alkyl succinic anhydride sample (mg KOH/g)
A=actives fraction of the alkenyl or alkyl succinic anhydride sample
$M_{po}$=number average molecular weight of the starting polyolefin
$M_{ma}$=98 (molecular weight of maleic anhydride)
C=conversion factor=112220 (for conversion of gram-moles of alkenyl or alkyl succinic anhydride per gram of sample to milligrams of KOH per gram of sample).

The actives fraction of the alkenyl or alkyl succinic anhydride may be determined from the percent of unreacted polyolefin according to the following procedure. A 5.0 gram sample of the reaction product of maleic anhydride and polyolefin is dissolved in hexane, placed in a column of 80.0 grams of silica gel (Davisil 62, a 140 angstrom pore size silica gel), and eluted with 1 liter of hexane. The percent unreacted polyolefin is determined by removing the hexane solvent under vacuum from the eluent and weighing the residue. Percent unreacted polyolefin is calculated according to the following formula:

$$\text{Percent } UnreactedPolyolefin = \frac{\text{Net Weight of Residue}}{\text{Sample Weight}} \times 100$$

The weight percent actives for the alkenyl or alkyl succinic anhydride product is calculated from the percent unreacted polyolefin using the formula:

Weight Percent Actives=100−Percent Unreacted Polyolefin

The actives fraction of the alkenyl or alkyl succinic anhydride is then calculated as follows:

$$\text{Actives Fraction} = \frac{WeightPercentActives}{100}.$$

The term "PTB" as used herein shall be understood to mean pounds per thousand barrels.

DETAILED DESCRIPTION OF THE PREFERRED EMBODIMENTS

Figure 1:
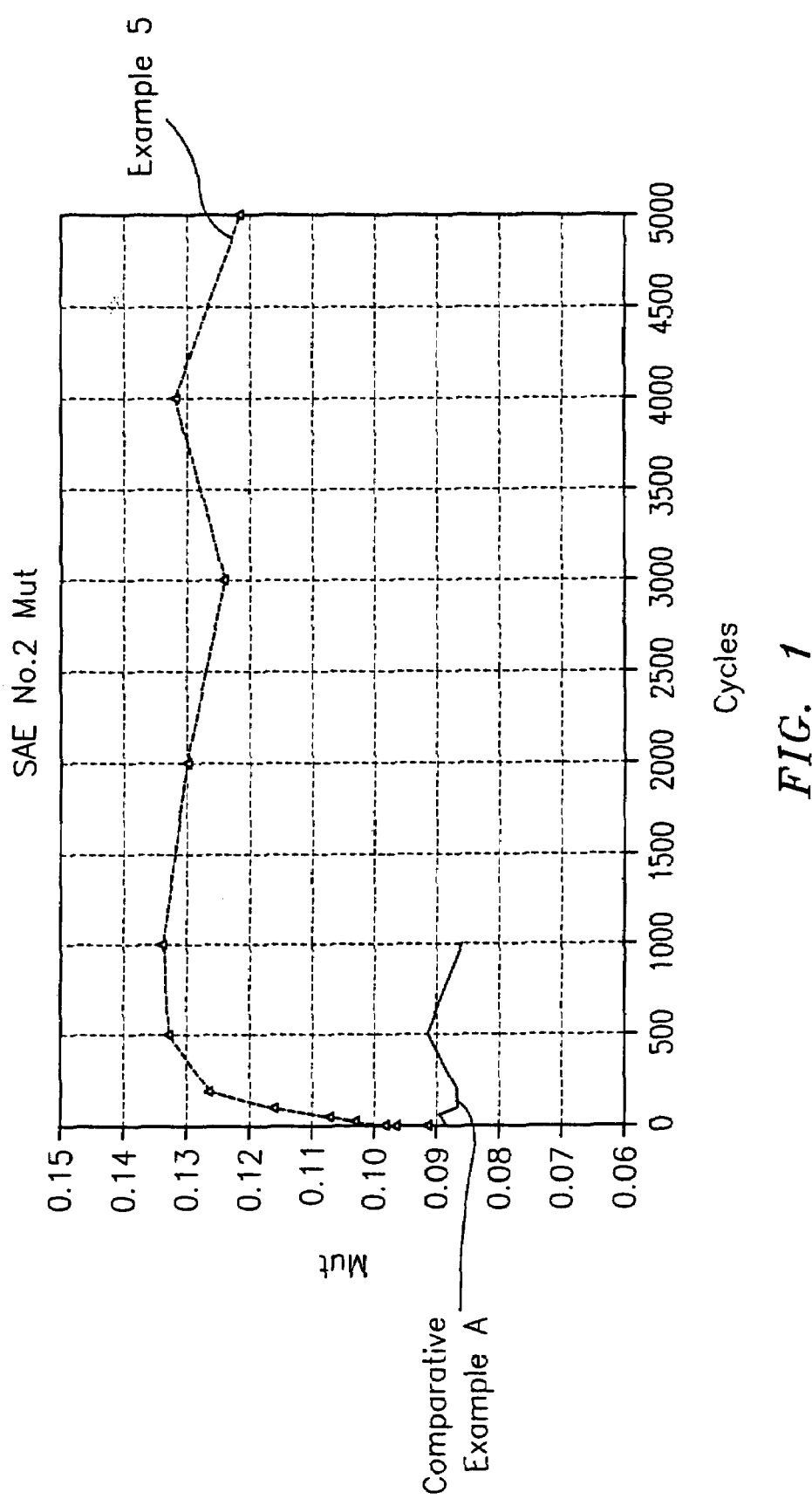
FIG. 1 is a graph of the coefficient of friction versus number of cycles illustrating the frictional properties of the automatic transmission fluid of Example 5 versus the -automatic transmission fluid of Comparative Example A; and, FIG. 2 is an IR spectra of the esterified PIB/UAR copolymer of Example 2.
Figure 2:
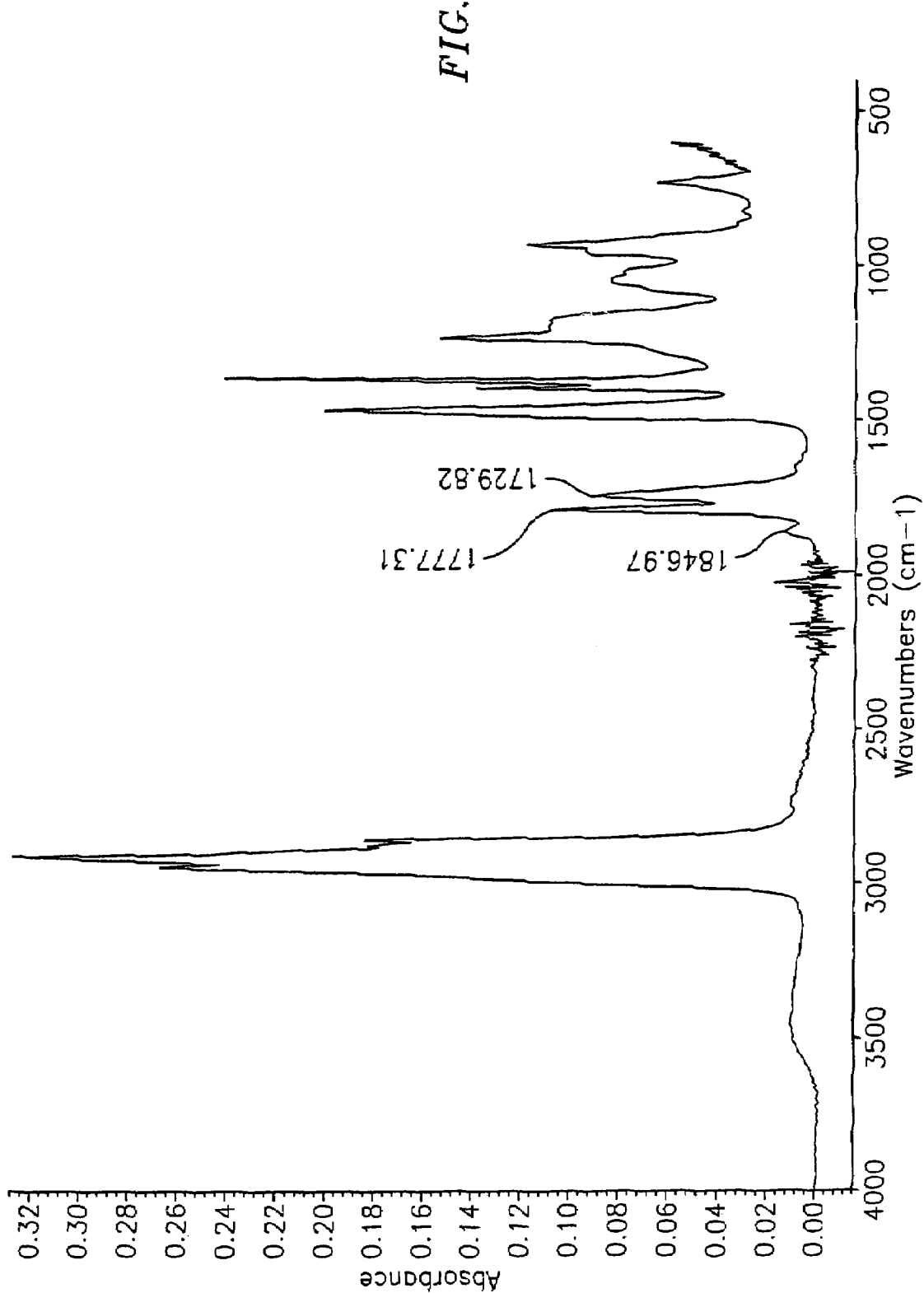

In accordance with the present invention, esterified copolymer reaction products referred to herein as the esterified polyalkene/UAR copolymer reaction products and particularly the esterified PIB/UAR copolymer reaction products are provided. The esterified polyalkene/UAR copolymer may be obtained as the reaction product of a polyalkene/UAR copolymer with a polyol, each of which are described herein below.

The Copolymers

The polyalkene/UAR copolymers for use in preparing the esterified polyalkene/UAR copolymers of the present invention possess the general formula (I):

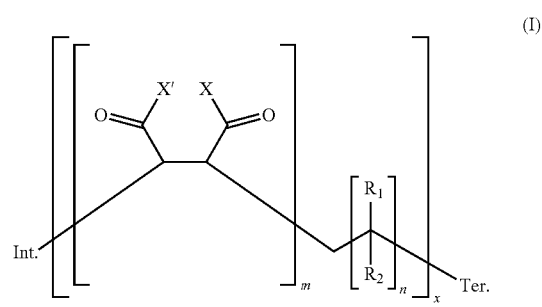

wherein X and X' in each repeating unit of the copolymer are independently selected from the group consisting of —OH; —O—$R_3$ wherein $R_3$ is a lower alkyl of 1 to 6 carbon atoms; or taken together are —O— to form a succinic anhydride group; n is a whole integer from 1 to 3; $R_1$ is a lower alkyl of 1 to 6 carbon atoms; $R_2$ is a polyalkyl group having about 9 to about 200 carbon atoms; m is a whole integer of from 1 to 3; x is a number greater than 1 up to 20; Int. is at least one initiating radical; and Ter. is at least one terminating group; and wherein the copolymer has a succinic ratio of about 1. Representative examples of these copolymers include those described in U.S. Pat. Nos. 5,112,507 and 5,616,668, the contents of which are incorporated by reference herein.

In a preferred embodiment, when maleic anhydride is used as the unsaturated acidic reagent, the reaction produces polyalkene/UAR copolymers predominately of the following formula (II):

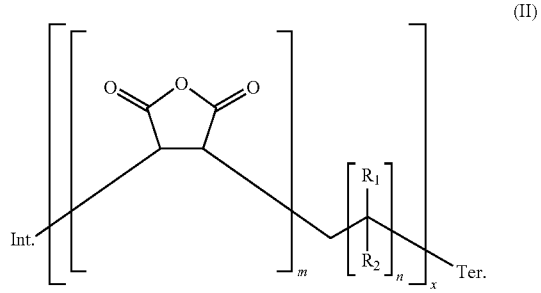

wherein $R_1$, $R_2$, n, m, x, Int. and Ter. are as defined above.

Generally, such copolymers contain an initiator group, Int., and a terminator group, Ter., as a result of the reaction with the free radical initiator used in the polymerization reaction. In such a case, the initiator and terminator groups may be:

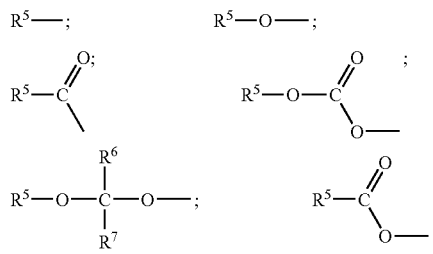

wherein $R^5$ is hydrogen, alkyl, aryl, alkaryl, aralkyl, cycloalkyl, alkoxy, cycloalkoxy, acyl, alkenyl, cycloalkenyl, alkynyl; or alkyl, aryl, alkaryl or aralkyl optionally substituted with 1 to 4 substituents independently selected from nitrile, keto, halogen, nitro, alkyl, aryl, and the like; and $R^6$ and $R^7$ are independently hydrogen, alkyl, aryl, alkaryl, aralkyl and the like. Alternatively, the initiator group and/or terminator group may be derived from the reaction product of the initiator with another material such as solvent; for example, the initiator may react with toluene to produce a benzyl radical.

The polyalkene/UAR copolymers have an average degree of polymerization of about 1.1 to about 20, and more preferably from about 1.5 to about 5. The polyalkene/UAR copolymers have a number average molecular weight of about 600 to about 30000 and preferably from about 650 to about 3000. The polyalkene/UAR copolymer may be alternating or random. Preferably, the polyalkene/UAR copolymer is an alternating copolymer.

A(1) The Polyalkene

The polyalkene employed in the preparation of the polyalkene/UAR copolymer is an olefin of sufficiently long chain length so that the resulting copolymer composition is soluble in and compatible with mineral oils, fuels and the like.

Olefins suitable for use herein are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of, for example, from 3 to 6 carbon atoms, and preferably from olefins of from 3 to 4 carbon atoms, and more preferably from propylene or isobutylene. The additional-polymerizable olefins employed are normally 1-olefins. The branch may be of from 1 to 4 carbon atoms, more usually of from 1 to 2 carbon atoms and preferably methyl.

In general, the polyalkene can contain both alkylvinylidene isomer and non-alkylvinylidene isomers with the alkylvinylidene isomer of the olefin preferably comprising at least about 20% of the total olefin composition. Preferably, the polyalkene is a polybutene, more preferably a polyisobutene, and most preferably a polyisobutene wherein at least 20%, but less than 100%, of the polyisobutene has methylvinylidene end groups. Typical PIBs for use in forming the esterified PIB/UAR copolymers of the present invention will contain about 9 to about 200 carbon atoms. More preferred PIBs contain from about 15 to about 100 carbon atoms, even more preferably from about 24 to about 80 carbon atoms and most preferably from about 28 to about 50 carbon atoms.

The olefinic bonds of a preferred PIB may comprise about 20% or more, preferably about 50% or more, and more preferred about 80% or more of the alkylvinylidene isomer. Accordingly, preferred PIB/UAR copolymers include those in which an unsaturated acidic reagent, most preferably maleic anhydride, is copolymerized with a PIB and wherein about 20% or more, preferably about 50% or more, and more preferred about 80% or more of the olefinic bonds of the PIB comprises alkylvinylidene.

The olefinic bonds of a more preferred PIB may comprise about 20% or more, preferably about 50% or more, and more preferred about 80% or more of the methylvinylidene isomer. Accordingly, more preferred PIB/UAR copolymers include those in which an unsaturated acidic reagent, most preferably maleic anhydride, is copolymerized with a PIB wherein about 20% or more, preferably about 50% or more, and more preferred about 80% or more of the olefinic bonds of the PIB comprises methylvinylidene.

Preferred PIBs include those PIBs prepared using a boron trifluoride ($BF_3$) catalyst. The preparation of PIBs in which the methylvinylidene isomer comprises a high percentage of the total composition is described in U.S. Pat. Nos. 4,152,499 and 4,605,808. PIB may be prepared directly or may be a distilled fraction of higher molecular weight polybutene.

PIB/UAR copolymers may comprise a mixture of PIB molecules of varying molecular weight because PIBs used to prepare PIB/UAR copolymers are generally mixtures of individual molecules of different molecular weights, e.g., PIBs having a number average molecular weight ($M_n$) of about 126 to 2800. Preferred PIBs have a number average molecular weight of about 210 to about 1400. Even more preferred PIBs have a number average molecular weight of about 336 to about 1120. Most preferred PIB has a number average molecular weight of about 350 to about 700. Also, the PIB/

UAR copolymer may comprise a PIB/UAR copolymer molecules having different degrees of polymerization.

The polyalkene used to prepare the polyalkene/UAR copolymer can also be used in combination with a 1-olefin (also known as an "alpha-olefin"). Suitable 1-olefins for use herein typically possess at least two carbon atoms, preferably five or more carbon atoms, and most preferably about 10 to about 30 carbon atoms. U.S. Pat. No. 5,792,729 discloses the preparation of terpolymers made from a polyalkene, a 1-olefin, and an unsaturated acidic reagent and is incorporated by reference herein.

A(2) The Unsaturated Acidic Reagent

The unsaturated acidic reagent for use in reacting with the foregoing polyalkenes can be any ethylenically unsaturated carboxylic acid or source of carboxylic acid functionality. These reactants typically contain at least one ethylenic bond and at least one and preferably two carboxylic acid groups, an anhydride group or a polar group which is convertible into a carboxylic acid group by oxidation or hydrolysis. Preferably the unsaturated acidic reagent refers to maleic or fumaric reagents of the general formula:

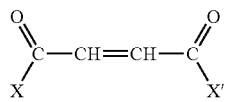

wherein X and X' are the same or different, provided that at least one of X and X' is a group that is capable of reacting to esterify alcohols, form metal salts with reactive metals or basically reacting metal compounds and otherwise function as acylating agents. Typically, X and X' comprise functional groups that may comprise one or more of —OH; —O—$R_3$ wherein $R_3$ is a lower alkyl of 1 to 6 carbon atoms; or taken together X and X' may be —O— so as to form an anhydride. Preferably, X and X' are such that both carboxylic functions can enter into acylation reactions. Suitable unsaturated acidic reagents include, but are not limited to, electron-deficient olefins such as maleic anhydride, maleic acid, maleic acid monoesters and diesters, fumaric acid, and fumaric acid monoesters and diesters.

A(3) Free Radical Initiator

A free radical initiator is an organic or inorganic substance that under reaction conditions will decompose to molecular fragment(s) having one or more unpaired electrons that are capable of initiating a polymerization reaction. Any free radical initiator may initiate the copolymerization described herein. Such initiators are well known in the art. However, the choice of free radical initiator may be influenced by the reaction temperature used in forming the polyalkene/UAR copolymer. Preferably, the free radical initiators for use herein are of the peroxide-type polymerization initiators and the azo-type polymerization initiators. If desired, radiation may also be used to initiate the reaction.

Suitable peroxide-type free radical initiators may be organic or inorganic radicals. Useful organic free radical initiators may have the general formula: $R^8OOR^9$ wherein $R^8$ is any organic radical and $R^9$ is one or more of hydrogen and any organic radical. Both $R^8$ and $R^9$ may be organic radicals, preferably hydrocarbon, aroyl, and acyl radicals, carrying, if desired, substituents such as, for example, halogens. Preferred peroxides include di-tert-butyl peroxide, tert-butyl peroxybenzoate, and dicumyl peroxide.

Examples of other suitable peroxides include, but are not limited to, benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

Useful azo-type compounds, typified by alpha,alpha'-azobisisobutyronitrile, are also well-known free radical promoting materials. These azo compounds may be defined as those having present in the molecule group —N=N— wherein organic radicals satisfy the balance, at least one of which is preferably attached to a tertiary carbon. Other suitable azo compounds include, but are not limited to, p-bromobenzenediazonium fluoroborate; p-tolyldiazoaminobenzene; p-bromobenzenediazonium hydroxide; azomethane and phenyldiazonium halides. Representative of the azo-type compounds are those disclosed in U.S. Pat. No. 2,551,813, the content of which are incorporated herein by reference.

The amount of free radical initiator to employ, exclusive of radiation, depends to a large extent on the particular initiator selected, the molecular weight PIB used and the reaction conditions. A preferred initiator is one that is soluble in the reaction medium. Preferred concentrations of initiator may be between about 0.001:1 and about 0.2:1 moles of initiator per mole of polyalkene, with preferred amounts between about 0.005:1 and about 0.10:1 moles.

It is preferred that the polymerization temperature is sufficiently high to break down the free radical initiator to produce the desired free radicals. The half-life values for known free radical initiators at various temperatures are readily available from the literature. See, for example, C. Walling, "Free Radicals in Solution", John Wiley and Sons, Inc., New York (1957). Alternatively, the half-life values are available from the various suppliers of free radical initiators. Table I lists the half-life temperatures for a number of free radical initiators at a given half-life. The half-life temperature is the temperature required for a free radical initiator to exhibit a specified half-life. As a rule, the higher the half-life temperature, the lower the half-life of the free radical initiator.

TABLE I

HALF-LIFE TEMPERATURES OF VARIOUS FREE RADICAL INITIATORS AT SPECIFIED HALF-LIVES

| | Half-Life (Temperature in degrees C.) | | | | |
|---|---|---|---|---|---|
| Free Radical Initiators | 5 Min. | 10 Min. | 2 Hrs. | 5 Hrs. | 10 Hrs. |
| Dialkyl Peroxides: | 173 | 166 | 143 | 135 | 129 |
| di-t-butyl peroxide | | | | | |
| di-t-amyl peroxide | 167 | 160 | 137 | 129 | 123 |
| di-cumyl peroxide | 161 | 154 | 131 | 123 | 117 |
| 2,5-dimethyl-2, | 164 | 157 | 134 | 126 | 120 |
| 5-di(t-butylperoxy) | 134 | 128 | 106 | 99 | 93 |
| hexane Peroxyketals: | | | | | |
| 1,1-di-tannylperoxy- | | | | | |
| Cyclohexane | 85 | 79 | 60 | 54 | 49 |
| Diperoxycarbonates: | | | | | |
| di-ethylhexylperoxy- | | | | | |
| Dicarbonate | 102 | 96 | 76 | 69 | 64 |
| Diacyl Peroxides: | | | | | |
| didecanoyl peroxide | | | | | |

In preparing the polyalkene/UAR copolymer, a single free radical initiator or a mixture of free radical initiators can be employed. For example, it may be desirable to add an initiator having a low decomposition temperature as the mixture of PIB and UAR is warming to reaction temperature, and then add an initiator having a higher decomposition temperature as the mixture reaches higher reaction temperatures. Alternatively, a combination of initiators could both be added prior to heating and reaction. In this case, an initiator having a high decomposition temperature would initially be inert, but would later become active as the temperature rose.

The initiator can also be added over time. For example, if an initiator is chosen with a short half-life, e.g., about 5 to about 20 minutes, at the reaction temperature, then the initiator can be added over a period of time so that an adequate concentration of free radicals will be available throughout the reaction period to give improved yields of the desired product.

A(4) General Preparation of the Copolymer

The foregoing polyalkene/UAR copolymers can be prepared by reacting one or more of the foregoing polyalkenes with one or more of the foregoing unsaturated acidic reagents in the presence of one or more of the foregoing free radical initiators.

In general, the reaction can be conducted neat, that is, the polyalkene(s), the unsaturated acidic reagent(s) and the free radical initiator(s) are combined in the proper ratio, and then stirred at the reaction temperature. The reaction time is typically a time sufficient to result in the substantially complete conversion of the reactive isomers of the polyalkene to the polyalkene/UAR copolymer. Suitable reaction times ordinarily range from about one hour to about 24 hours and preferably from about two to about ten hours.

Polymerization or copolymerization of the polyalkene(s) and unsaturated acidic reagent(s) in the presence of the free radical initiator(s) can be carried out in any known manner, e.g., in the liquid phase, i.e., in a solution or slurry process, or in a suspension process, either continuously or in batch. The important factors are intimate contact of the polyalkene and unsaturated acidic reagent in the presence of the free radical initiator. The components in the reaction mixture can also be added continuously to a stirred reactor with continuous removal of a portion of the product to a recovery train or to other reactors in series. The reaction can also take place in a tubular reactor in which the components can be added at one or more points along the tube.

The reaction is generally carried out at temperatures in the range of from about −30° C. to about 210° C. and preferably from about 40° C. to about 150° C., and pressures from about 0 to about 40 psig. As one skilled in the art would readily appreciate, it is preferred that the polymerization temperature is sufficiently high to decompose the free radical initiator to produce the desired free radicals. For example, using benzoyl peroxide as the initiator, the reaction temperature can be between about 75° C. to about 90° C. and preferably between about 80° C. to about 85° C. The degree of polymerization is inversely proportional to the temperature. Thus, higher reaction temperatures are ordinarily preferred for preparing polyalkene/UAR copolymers with a particularly low degree of polymerization. In general, after the reaction is deemed complete by, for example, NMR analysis, the reaction mixture is heated to decompose any residual initiator. For a di-tert-butyl peroxide initiator, this temperature is generally about 16° C. or higher.

When the polyalkene, unsaturated acidic reagent and free radical initiator react to provide a polyalkene/UAR copolymer, the polyalkene/UAR copolymer that is formed assists in dissolving the unsaturated acidic reagent. This facilitates the reaction of unreacted polyalkene, unsaturated acidic reagent and free radical initiator. In light of this phenomenon, previously formed polyalkene/UAR copolymers may be used to facilitate new reactions of polyalkene, unsaturated acidic reagent and free radical initiator reactants. Using the polyalkene/UAR copolymer to facilitate this reaction is referred to herein as the heel process.

A preferred process to use the polyalkene/UAR copolymer in the heel process is to combine the polyalkene, unsaturated acidic reagent and polyalkene/UAR copolymer; heat this combination to reaction temperature; and then add the free radical initiator while maintaining a suitable reaction temperature. This process can be conducted in batch or in continuous mode.

The polyalkene/UAR copolymer for use in the heel process can be obtained by retaining a portion of the polyalkene/UAR copolymer from a previous run. Preferred polyalkene/UAR copolymers for use in the heel process include the copolymer product of PIB and maleic anhydride. The preferred volume ratio of PIB/UAR copolymer to PIB in the heel process is between about 1:20 and 1:1. A more preferred volume ratio of PIB/UAR copolymer to PIB in the heel process is between about 1:10 and about 1:5.

The heel process reaction is advantageously conducted at a temperature in the range of about 90° C. to about 210° C. and more preferably from about 130° C. to about 150° C. At lower reaction temperatures the reaction mixture may become too viscous and may require a solvent to obtain satisfactory reaction.

The unsaturated acidic reagent charge may theoretically range from about 0.5 to about 2 moles of unsaturated acidic reagent per mole of methyl vinylidene isomer of PIB. Typically, the free radical initiator may be charged at about 0.01 moles initiator per about 0.05 moles polyalkene, although this may vary. The reaction can be carried out at atmospheric pressure. At higher temperatures, it is desirable to pressurize the reactor slightly (i.e., about 10 psig) to suppress the loss of unsaturated acidic reagent to the vapor phase.

If a batch reaction is used, PIB/UAR copolymer from a previous run and PIB can be charged to the reactor. A sufficient ratio of PIB to PIB/UAR copolymer to assure complete solubility of unsaturated acidic reagent in the mixture at reaction conditions is preferred. If PIB/UAR copolymer is not added at a sufficient level so as to maintain total unsaturated acidic reagent solubility, the rate of reaction may be negatively affected, and the formation of resin may be likely. To maximize reactor productivity, the minimum amount of PIB/UAR copolymer that is optimal to maintain total solubility of the unsaturated acidic reagent charge should be used. The reactor can be stirred and heated to the desired reaction temperature, and the unsaturated acidic reagent and free radical initiator are added at the appropriate time/times during this step. Reaction times will vary according to such factors as, for example, temperature, concentration of reactants, and types of free radical initiators. When the reaction is complete, removal of any unreacted unsaturated acidic reagent can be accomplished by increasing the reactor temperature to about 150° C. to about 250° C. and preferably from about 180° C. to about 200° C., while applying sufficient vacuum. This procedure also tends to decompose any remaining free radical initiator.

If the reaction is run continuously, a continuous stirred tank reactor (CSTR) or series of such reactors can be employed. Accordingly, PIB, unsaturated acidic reagent, and free radical initiator can be fed continuously at appropriate rates so as to maintain a certain level of conversion of the reactants to PIB/UAR copolymer. It is envisioned that the product stream from the reactor then is heated to a temperature in the range of about 150° C. to about 250° C. and preferably in the range from about 180° C. to about 200° C. to strip off any unreacted unsaturated acidic reagent and to decompose any remaining free radical initiator. Vacuum can also be used to facilitate removing any unreacted unsaturated acidic reagent. It is also envisioned that a wiped film evaporator or similar types of equipment are suitable for this type of operation. In general and as discussed above, after the reaction is deemed complete the reaction mixture is heated to decompose any residual initiator.

The reaction can be carried out in the absence of a diluent or, if desired, in the presence of a diluent. When a diluent is employed, those diluents that are inert to the reactants and products formed are preferred.

Although a solvent is not necessary to prepare the PIB/UAR copolymer, one can be used. Solvents that can be employed are those that are inert to the reactants and products formed. Suitable solvents include the ketones having from three to six carbon atoms and the saturated dehalogenated hydrocarbons having from one to five, more preferably one to three, carbon atoms. Examples of suitable solvents include, but are not limited to:

1. ketones, such as: acetone; methylethylketone; diethylketone; and methylisobutylketone;
2. aromatic hydrocarbons, such as: benzene; xylene; and toluene;
3. saturated dihalogenated hydrocarbons, such as: dichloromethane; dibromomethane; 1-bromo-2-chloroethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloropropane; 1-bromo-2-chloropropane; 1,2-dichlorobutane; 1,5-dibromopentane; and 1,5-dichloropentane; or
4. mixtures of the above, such as: benzene or methylethylketone. Suitable solvents include, but are not limited to, acetone, tetrahydrofuran, chloroform, methylene chloride, dichloroethane, toluene, dioxane, chlorobenzene, xylenes, or the like. Solvents can be removed after their usefulness is no longer required. The PIB/UAR copolymer product can be conveniently separated from any solvent used and any unreacted acidic reagent by conventional procedures, e.g., by phase separation, solvent distillation, precipitation and the like. Though not required, dispersing agents and/or co-solvents can be used during the reaction.

Although a chain transfer agent to prepare the PIB/UAR copolymer of this invention is not required, one can be used when desired. Typically, chain transfer agents that are inert to the reactants and products formed are preferred are used herein.

The Esterified Copolymers

The preferred esterified polyalkene/UAR copolymers of the present invention are a reaction product of a polyol and a copolymer of the general formula (I):

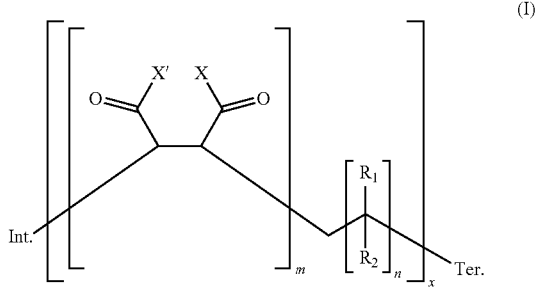

(I)

wherein X and X' in each repeating unit of the copolymer are independently selected from the group consisting of —OH; —O—R$_3$ wherein R$_3$ is a lower alkyl of 1 to 6 carbon atoms; or taken together are —O— to form a succinic anhydride group; n is a whole integer from 1 to 3; R$_1$ is a lower alkyl of 1 to 6 carbon atoms; R$_2$ is a polyalkyl having from about 9 to about 200 carbon atoms; m is a whole integer of from 1 to 3; x is a number greater than 1 up to 20; Int. is at least one initiating radical; and Ter. is at least one terminating group; and wherein the copolymer has a succinic ratio of about 1. The PIB/UAR copolymers prior to esterification typically have an average degree of polymerization of about 1.1 to about 20, preferably from about 1.5 to about 10 and more preferably from about 2 to about 8. The esterified PIB/UAR copolymers may have a number average molecular weight of about 600 to about 30,000, preferably 1,000 to 25,000, even more preferably 5,000 to 25,000 and most preferably 10,000 to 20,000.

The esterified polyalkene/UAR copolymer reaction products of the present invention can be prepared by reacting the foregoing polyalkene/UAR copolymers with an effective amount of one or more polyols under esterification reaction conditions. Suitable polyols for use herein have the formula R" (OH)$_y$, where R" is a hydrocarbon radical and y is an integer representing the number of hydroxy radicals and has a value of from 2 to about 10. The polyols preferably contain less than about 12 carbon atoms, and have from 2 to about 10 and preferably 3 to 6, hydroxy radicals. Examples of suitable polyols include alkylene glycols and poly(oxyalkylene) glycols, e.g., ethylene glycol, di(ethylene glycol), tri(ethylene glycol), di(propylene glycol), tri(butylene glycol), penta(ethylene glycol), and other poly(oxyalkylene) glycols formed by the condensation of two or more moles of ethylene glycol, propylene glycol, octylene glycol, or a like glycol having up to 12 carbon atoms in the alkylene radical. Other useful polyols include, but are not limited to, glycerol, pentaerythritol, 2,4-hexanediol, pinacol, erythritol, arabitol, sorbitol, mannitol, 1,2-cyclohexanediol, xylylene glycol, and 1,3,5-cyclohexanetriol. One preferred polyol is pentaerythritol. Other useful polyols are disclosed in U.S. Pat. No. 4,034,038, the contents of which are incorporated herein by reference. Esterification can be advantageously effected at a temperature of about 100° C. to about 220° C. and preferably from about 150° C. to about 200° C. Ordinarily, the reaction is carried out at substantially atmospheric pressure, although pressures above atmospheric can be employed with more volatile reactants. The reaction can be carried out in the absence of a catalyst, or in the presence of an acid-type catalyst such as, for example, mineral acids, sulfonic acids, Lewis type acids and the like. Suitable reaction conditions and catalysts are disclosed in U.S. Pat. No. 3,155,686, the contents of which are incorporated herein by reference. Concentration of polyol will ordinarily range from about 0.1 to about 1, preferably from about 0.5 to about 0.8 and most preferably about 0.75 times the number of anhydride units as measured by the SAP number. Unreacted polyol must be removed by any conventional technique, for example, filtration.

When the polyalkene/UAR copolymers and particularly the PIB/maleic anhydride copolymers are esterified to form the reaction products of the present invention, the resulting reaction product will contain ester, acid, and anhydride functional groups. Among other factors, it is expected that the internal anhydride units, within the copolymer, are not reactive towards esterification. Thus, as one skilled in the art would readily appreciate, the copolymer is partially esterified, e.g., the esterification of the copolymers being continued to such an extent that about 1 to about 99%, preferably from about 20 to about 80% and most preferably from about 40 to about 70% of the carboxyl groups of the copolymers are esterified.

Post-Treatments

The foregoing esterified polyalkene/UAR copolymer reaction products can be post-treated with a wide variety of post-treating reagents. For example, the dispersancy of the esterified polyalkene/UAR copolymers of the present invention can be improved by reaction with a cyclic carbonate The cyclic carbonate post-treatment may be conducted under conditions sufficient to cause reaction of the cyclic carbonate with free hydroxyl groups within the esterified polyalkene/UAR copolymers. The reaction is ordinarily conducted at temperatures ranging from about 100° C. to about 220° C., preferably from about 150° C. to about 200° C.

The reaction may be conducted neat, wherein both the esterified copolymer reaction product and the cyclic carbonate are combined in the proper ratio. The same solvents or diluents as described above with respect to the preparing the esterified PIB/UAR copolymer may also be used in the cyclic carbonate post-treatment.

A particularly preferred cyclic carbonate for use herein is 1,3-dioxolan-2-one (ethylene carbonate).

The cyclic carbonate post-treatment can be advantageously effected at a temperature of about 100° C. to about 220° C. and preferably from about 150° C. to about 200° C. Ordinarily, the reaction is carried out at substantially atmospheric pressure, although pressures above atmospheric can be employed with more volatile reactants. Concentration of cyclic carbonate will ordinarily range from about 0.1 to about 1, preferably from about 0.5 to about 0.8 times the number of moles of polyol employed in the esterification reaction step.

The foregoing esterified polyalkene/UAR copolymer reaction products and the post-treated foregoing esterified PIB/UAR copolymer reaction products of this invention can be further reacted with boric acid or a similar boron compound such as, for example, boron oxides, boron halides and esters of boric acid, to form borated dispersants having utility within the scope of this invention. Generally from about 0.1 equivalents to about 10 equivalents and preferably from about 0.2 equivalents to about 1 equivalents of boron compound per equivalents of hydroxyl in the esterified PIB/UAR copolymer can be used.

Lubricating Oil Compositions

The esterified polyalkene/UAR copolymer and post-treated esterified polyalkene/UAR copolymer reaction products of the present invention are useful as additives when used in lubricating oil compositions such as, for example, power transmission fluids. When the foregoing esterified polyalkene/UAR copolymer and post-treated esterified polyalkene/UAR copolymer reaction products of the present invention are used as a friction modifier in, for example, a power transmission fluid composition containing a major amount of an oil of lubricating viscosity, the friction modifier is ordinarily present in the composition in a minor effective amount ranging from about 0.1 to about 10 wt. %, preferably from about 0.5 wt. % to about 5% wt. % and more preferably at about 1 wt. % to about 3 wt. %, based on the total weight of the lubricating oil composition.

The oils of lubricating viscosity for use in a lubricating oil composition such as, for example, a power transmission fluid, are selected from one or more natural oils, synthetic oils or mixtures thereof. Useful natural oils include mineral lubricating oils such as, for example, liquid petroleum oils, solvent-treated or acid-treated mineral lubricating oils of the paraffinic, naphthenic or mixed paraffinic-naphthenic types, oils derived from coal or shale, animal oils, vegetable oils (e.g., castor oils and lard oil), and the like.

Useful synthetic lubricating oils include, but are not limited to, hydrocarbon oils and halo-substituted hydrocarbon oils such as polymerized and interpolymerized olefins, e.g., polybutylenes, polypropylenes, propylene-isobutylene copolymers, chlorinated polybutylenes, poly(1-hexenes), poly(1-octenes), poly(1-decenes), and the like and mixtures thereof; alkylbenzenes such as dodecylbenzenes, tetradecylbenzenes, dinonylbenzenes, di(2-ethylhexyl)-benzenes, and the like; polyphenyls such as biphenyls, terphenyls, alkylated polyphenyls, and the like; alkylated diphenyl ethers and alkylated diphenyl sulfides and the derivative, analogs and homologs thereof and the like.

Other useful synthetic lubricating oils include, but are not limited to, oils made by polymerizing olefins of less than 5 carbon atoms such as ethylene, propylene, butylenes, isobutene, pentene, and mixtures thereof. Process of preparing such polymer oils are well known to those skilled in the art.

Additional useful synthetic hydrocarbon oils include liquid polymers of alpha olefins having the proper viscosity. Especially useful synthetic hydrocarbon oils are the hydrogenated liquid oligomers of $C_6$ to $C_{12}$ alpha olefins such as, for example, 1-decene trimer.

Another class of useful synthetic lubricating oils include, but are not limited to, alkylene oxide polymers, i.e., homopolymers, interpolymers, and derivatives thereof where the terminal hydroxyl groups have been modified by, for example, esterification or etherification. These oils are exemplified by the oils prepared through polymerization of ethylene oxide or propylene oxide, the alkyl and amyl ethers of these polyoxyalkylene polymers (e.g., methyl poly propylene glycol ether having an average molecular weight of 1,000, diphenyl ether of polyethylene glycol having a molecular weight of 500-1000, diethyl ether of polypropylene glycol having a molecular weight of 1,000-1,500, etc.) or mono- and polycarboxylic esters thereof such as, for example, the acetic esters, mixed $C_3$-$C_8$ fatty acid esters, or the $C_{13}$Oxo acid diester of tetraethylene glycol.

Yet another class of useful synthetic lubricating oils include, but are not limited to, the esters of dicarboxylic acids e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acids, alkyl malonic acids, alkenyl malonic acids, etc., with a variety of alcohols, e.g., butyl alcohol, hexyl alcohol, dodecyl alcohol, 2-ethylhexyl alcohol, ethylene glycol, diethylene glycol monoether, propylene glycol, etc. Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include, but are not limited to, those made from monocarboxylic acids having from about 5 to about 12 carbon atoms and polyols and polyol ethers such as neopentyl glycol, trimethylol propane, pentaerythritol, dipentaerythritol, tripentaerythritol, and the like.

Silicon-based oils such as, for example, polyalkyl-, polyaryl-, polyalkoxy- or polyaryloxy-siloxane oils and silicate oils, comprise another useful class of synthetic lubricating oils. Specific examples of these include, but are not limited to, tetraethyl silicate, tetra-isopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, and the like. Still yet other useful synthetic lubricating oils include, but are not limited to, liquid esters of phosphorous containing acids, e.g., tricresyl phosphate, trioctyl phosphate, diethyl ester of decane phosphionic acid, etc., polymeric tetrahydrofurans and the like.

The lubricating oil may be derived from unrefined, refined and rerefined oils, either natural, synthetic or mixtures of two or more of any of these of the type disclosed hereinabove. Unrefined oils are those obtained directly from a natural or synthetic source (e.g., coal, shale, or tar sands bitumen) without further purification or treatment. Examples of unrefined oils include, but are not limited to, a shale oil obtained directly from retorting operations, a petroleum oil obtained directly from distillation or an ester oil obtained directly from an esterification process, each of which is then used without further treatment. Refined oils are similar to the unrefined oils except they have been further treated in one or more purification steps to improve one or more properties. These purification techniques are known to those of skill in the art and include, for example, solvent extractions, secondary distillation, acid or base extraction, filtration, percolation, hydrotreating, dewaxing, etc. Rerefined oils are obtained by treating used oils in processes similar to those used to obtain refined oils. Such rerefined oils are also known as reclaimed or reprocessed oils and often are additionally processed by techniques directed to removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over a hydroisomerization catalyst.

Natural waxes are typically the slack waxes recovered by the solvent dewaxing of mineral oils; synthetic waxes are typically the wax produced by the Fischer-Tropsch process.

Lubricating oil concentrates are also contemplated herein. These concentrates usually include at least from about 90 wt. % to about 10 wt. % and preferably from about 90 wt. % to about 50 wt. %, of an oil of lubricating viscosity and from about 10 wt. % to about 90 wt. %, preferably from about 10 wt. % to about 50 wt. %, of the foregoing esterified polyalkene/UAR copolymer and post-treated esterified polyalkene/UAR copolymer reaction products of the present invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils that may be used as diluents typically have viscosity in the range from about 35 to about 500 Saybolt Universal Seconds (SUS) at 100° F. (38° C.), although any oil of lubricating viscosity may be used.

If desired, other additives can be admixed with the foregoing lubricating oil compositions to enhance performance. Examples of these additives include, but are not limited to, rust inhibitors, foam inhibitors, corrosion inhibitors, metal deactivators, pour point depressants, antioxidants, wear inhibitors and the like, at the usual levels in accordance with well known practice.

It is also contemplated that the additives described herein may be employed as dispersants and detergents in hydraulic fluids, marine crankcase lubricants and the like. When so employed, the additive is added at from about 0.1 to 10% by weight to the oil and preferably from about 0.5 to about 8% by weight to the oil, based on the total weight of the lubricant composition.

Fuel Compositions

The foregoing esterified polyalkene/UAR copolymer reaction products of the present invention are also useful as a friction modifier additive for fuel compositions.

The fuel can be any internal combustion engine hydrocarbon fuel, e.g., diesel, gasoline, kerosene, jet fuels, etc.; alcoholic fuels such as methanol or ethanol; or a mixture of any of the foregoing. When the fuel is diesel, such fuel generally boils above about 212° F. The diesel fuel can comprise atmospheric distillate or vacuum distillate, or a blend in any proportion of straight run and thermally and/or catalytically cracked distillates. Preferred diesel fuels have a cetane number of at least 40, preferably above 45, and more preferably above 50.

The diesel fuel can have such cetane numbers prior to the addition of any cetane improver. The cetane number of the fuel can be raised by the addition of a cetane improver.

When the fuel is gasoline, it can be derived from straight-chain naphtha, polymer gasoline, natural gasoline, catalytically cracked or thermally cracked hydrocarbons, catalytically reformed stocks, etc. It will be understood by one skilled in the art that gasoline fuels typically boil in the range of about 80'-450° F. and can contain straight chain or branched chain paraffins, cycloparaffins, olefins, aromatic hydrocarbons, and any mixture of these.

Generally, the composition of the fuel is not critical and any conventional motor fuel base can be employed in the practice of this invention.

The proper concentration of the foregoing esterified polyalkene/UAR copolymer reaction products of the present invention that are necessary to achieve the desired friction modification in fuel compositions is dependent upon a variety of factors including, for example, the type of fuel used, the presence of other additives, etc. Generally, however, the range of esterified copolymer additive concentration in the base fuel is from about 10 to about 10,000 parts per million and preferably from about 30 to about 5000 parts per million of the additive per part of base fuel. If other friction modifiers are present, a lesser amount of the esterified copolymer additive may be used.

The additives described herein may also be formulated as a fuel concentrate, using an inert stable oleophilic organic solvent boiling in the range of about 150EF. to about 400EF. An aliphatic or an aromatic hydrocarbon solvent is preferred, e.g., solvents such as benzene, toluene, xylene or higher-boiling aromatics or aromatic thinners. Aliphatic alcohols of about 3 to 8 carbon atoms, e.g., isopropanol, isobutylcarbinol, n-butanol and the like, in combination with hydrocarbon solvents are also suitable for use with the fuel additive. In the fuel concentrate, the amount of the additive will be ordinarily be about 5 or more wt. % and generally not exceed about 70 wt.

%, preferably from about 5 wt. % to about 50 wt. % and more preferably from about 10 wt. % to about 25 wt. %.

Cold Flow Improver

It is also contemplated that the foregoing esterified PIB/UAR copolymer and post-treated esterified PIB/UAR copolymers of the present invention are useful as cold flow improvers in diesel fuels.

The following non-limiting examples are illustrative of the invention.

EXAMPLE 1

Preparation of PIB/MA Copolymer

To a 20 L 3 neck glass round bottom reactor equipped with a mechanical stirrer, thermocouple, temperature controller, heat mantle, Claisen adapter, Dean-Stark trap, reflux condenser, nitrogen inlet, and septum was added 4025 g (7.32 mol) of 550 MW polyisobutylene (available from BASF) having greater than 60% of the methyl vinylidene isomer with 3051 g of Exxon 100 solvent (a $C_9$ aromatic solvent). The mixture was stirred under nitrogen, and heated to 130° C.; and 15 ml was collected in the trap. Next, 681.5 g (6.95 mol) of maleic anhydride was added in two 170.4 g aliquots and one 340.8 g aliquot at approximately 60 minute intervals. 67 ml (0.366 mol) di-t-butyl peroxide was added in five 13.4 ml aliquots at approximately 30 minute intervals coincident with the maleic anhydride addition. The reactants were stirred at 130° C. for an additional 16 hours. The solvent and unreacted maleic anhydride were then removed, en vacuo, at 200° C. to yield a yellow oil having a sap number of 105.7 mg KOH/g.

EXAMPLE 2

Preparation of Esterified PIB/MA Copolymer

To a 2 L 3 neck glass round bottom reactor flask equipped with a mechanical stirrer, thermocouple, temperature controller, heat mantle, Dean-Stark trap, reflux condenser, and nitrogen inlet was added 535 g of the maleic anhydride/polybutene copolymer of example 1 and 59.19 g (0.435 mol, 0.88 equivalents) of pentaerythritol. The reactants were stirred, under a gentle sweep of nitrogen, at 190° C. for about 3.5 hours to yield 567.5 g of a viscous yellow oil that contained unreacted pentaerythritol. The crude product was diluted with 358.7 g of Exxon 150 neutral oil (a group I basestock) and was pressure filtered through Celite superflow filter aid to yield a yellow oil.

EXAMPLE 3

Preparation of Esterified PIB/MA Copolymer

To a 20 L 3 neck glass round bottom reactor equipped with a mechanical stirrer, thermocouple, temperature controller, heat mantle, Claisen adapter, Dean-Stark trap, reflux condenser, nitrogen inlet, and septum was added 4027 g (7.32 mol) of 550 MW polyisobutylene (available from BASF) having greater than 60% of the methyl vinylidene isomer, 686.1 g (7.00 mol) of maleic anhydride, and 2884 g of Exxon 100 solvent (a $C_9$ aromatic solvent). The reactants were stirred, under nitrogen, and heated to 130° C. Dicumyl peroxide 94.2 g (0.348 mol) was added, dissolved in Exxon 100 solvent, in four 60 ml aliquots and one 200 ml aliquot at approximately 30 minute intervals. The reactants were stirred at 130° C. for an additional 16 hours. Solvent and unreacted maleic anhydride were removed, en vacuo, at 200° C. Then, 638.8 g (4.69 mol) of pentaerythritol was added and the mixture was stirred, heated at 190° C., and a gentle sweep of nitrogen was passed through the reactor for about 4 hours. The product was diluted with 2681 g of Exxon 150N oil and filtered through Celite superflow filter aid to yield an amber oil.

EXAMPLE 4

Post Treatment of Esterified Copolymer

To a 2 L three neck glass round bottom flask equipped with a mechanical stirrer, thermocouple, temperature controller, heat mantle, Dean-Stark trap, reflux condenser, and nitrogen inlet was added 169.7 g of the product from example 2, 16.97 g (0.275 mol) of boric acid, and 16.5 g of deionized water. The reactants were stirred, under a gentle nitrogen sweep, and heated at 95° C. for about 3.5 hours, then at 145° C. for about 1.5 hours, and finally at 170° C. for about 1 hour followed by vacuum for about 5 minutes. The product was pressure filtered through celite superflow filter aid to yield a yellow oil that contained 0.65% boron by weight.

EXAMPLE 5

Frictional Properties in Automatic Transmission Fluid

A baseline automatic transmission fluid was formed containing a conventional base oil, together with conventional additives, including 2.5 mM/kg of an synthetic overbased calcium sulfonate on a calcium basis, 0.4% of an amine anti-oxidant, 0.25% of a phenolic anti-oxidant, 0.2% of an alkyl phosphate, 1% of a fatty acid, 2% of an amide friction modifier, and other conventional additives selected from a foam inhibitor, corrosion inhibitor and dispersant. The reaction product of Example 2 was formulated into this baseline fluid at 4.5 weight percent.

COMPARATIVE EXAMPLE A

Frictional Properties in Automatic Transmission Fluid

A baseline automatic transmission fluid was formed containing the same additives, base oil and treat rate, as in Example 5. A commercially available polyisobutenyl succinate ester, prepared by reacting a polyisobutenyl succinic anhydride monomer with pentaerythritol, was formulated into this baseline fluid at 4.5 weight percent.

SAE #2 Friction TEST

The automatic transmission fluids of Example 5 and Comparative Example A were evaluated, under identical conditions, in an SAE number 2 test system according to JASO M348-2002, described in Watanabe, N. et al "The requirements for the Latest ATF and Problems of Commercially Available ATF" which was presented at SAE Fuels and Lubes Asia Conference—February 2002. This test was used to evaluate the frictional properties of automatic transmission fluids. Results are measured by friction coefficients and are related to the torque capacity of the test fluid where a higher friction coefficient corresponds to a desirable, high torque capacity. The results of this evaluation are outlined in FIG. 1 where the higher line corresponds to the automatic transmission fluid of Example 5, and the lower line to the automatic transmission fluid of Comparative Example A. These results show the superior frictional properties of the automatic transmission fluid of Example 5 as compared to the automatic transmission fluid of Comparative Example A. In addition, Comparative Example A provided unstable friction which resulted in the early termination of the test.

EXAMPLE 6

Diesel Fuel Economy

A diesel fuel composition was prepared by adding 210 PTB of the esterified PIB/MA copolymer reaction product of Example 2 to a baseline diesel fuel.

COMPARATIVE EXAMPLE B

The baseline diesel fuel of Example 6 containing no esterified PIB/MA copolymer reaction product was employed as a comparative example in the diesel fuel economy test below.

Diesel Fuel Economy Test

The diesel fuel composition of Example 6 was compared to the baseline diesel fuel of Comparative Example B in a diesel engine fuel economy test. A 1.9 liter 4 cylinder Volkswagen TDI diesel engine was conditioned by motoring at 2200 rpm under 75 lb-ft load for 16 hours. The diesel fuel composition of Example 6 and baseline diesel fuel of Comparative Example B were then evaluated in the following test sequence. The engine was motored under 25 lb-ft load with the oil sump temperature controlled at 150, 200, 250, 250, 200, and 150° F. in stages of 2 hours each for a total running time of 12 hours; fuel consumption was measured by conventional methods. The baseline diesel fuel of Comparative Example B was tested, followed by the diesel fuel composition of Example 6. The diesel fuel composition of Example 6 containing the esterified PIB/MA copolymer reaction product of Example 2 resulted in a 2% fuel economy improvement as calculated by a comparison of the fuel consumption from the Example 6 test run to the fuel consumption from the Comparative Example B test run.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A process for preparing an esterified copolymer, said process comprising reacting a polyol with a copolymer consisting essentially of the reaction product obtained from the copolymerization of one or more polyalkenes having from about 9 to about 200 carbon atoms with one or more unsaturated acidic reagents in the presence of one or more free radical initiators, wherein the esterified copolymer is from about 40 to about 70% esterified.

2. The process of claim 1, wherein the polyalkene is a polyisobutylene.

3. The process of claim 2, wherein the polyisobutylene has about 15 to about 100 carbon atoms.

4. The process of claim 2, wherein the polyisobutylene has about 24 to about 80 carbon atoms.

5. The process of claim 2, wherein the polyisobutylene has about 28 to about 50 carbon atoms.

6. The process of claim 1, wherein at least 20 percent of the total polyalkene is an alkylvinylidene isomer.

7. The process of claim 1, wherein at least 50 percent of the total polyalkene is an alkylvinylidene isomer.

8. The process of claim 2, wherein the polyisobutylene has a number average molecular weight of about 210 to about 1400.

9. The process of claim 2, wherein the polyisobutylene has a number average molecular weight of about 336 to about 1120.

10. The process of claim 2, wherein the polyisobutylene has a number average molecular weight of about 350 to about 700.

11. The process of claim 1, wherein the unsaturated acidic reagent is maleic anhydride.

12. The process of claim 1, wherein the polyol is of the formula $R''(OH)_y$, wherein $R''$ is a hydrocarbon radical and y is an integer representing the number of hydroxy radicals and has a value of from 2 to about 10.

13. The process of claim 1 wherein the polyol is selected from the group consisting of ethylene glycol, di(ethylene glycol), tri(ethylene glycol), di(propylene glycol), tri(butylene glycol), penta(ethylene glycol), glycerol, pentaerythritol, 2,4-hexanediol, pinacol, erythritol, arabitol, sorbitol, mannitol, 1,2-cyclohexanediol, xylylene glycol, 1,3,5-cyclohexanetriol and mixtures thereof.

14. The process of claim 1, wherein the polyol is pentaerythritol.

15. The process of claim 1, wherein the esterified copolymer has a number average molecular weight of about 600 to about 30,000.

16. The process of claim 1, wherein the esterified copolymer has a number average molecular weight of about 5,000 to about 25,000.

17. The process of claim 1, wherein the esterified copolymer has a number average molecular weight of about 10,000 to about 20,000.

18. The process of claim 1, wherein the copolymer is an alternating copolymer.

* * * * *